United States Patent Office 3,646,165
Patented Feb. 29, 1972

3,646,165
PROCESSES FOR GRAFTING UNSATURATED
ACIDS OR ESTERS ON POLYETHYLENE
Claude Favie, Billere, and Werner Dellsperger and
Philippe Meline, Pau, France, assignors to Societe
Anonyme dite, Societe Nationale des Petroles d'Aquitaine, Courbevoie, France
No Drawing. Filed June 27, 1969, Ser. No. 837,328
Claims priority, application France, June 28, 1968,
157,143, 157,145
Int. Cl. C08f 1/13, 15/00
U.S. Cl. 260—878 R         16 Claims

ABSTRACT OF THE DISCLOSURE

One or more monomers selected from polymerisable unsaturated acids and esters is or are grafted onto non-preactivated polyethylene in aqueous suspension by first dissolving each monomer to be grafted in the polyethylene suspension and then subjecting the latter to the action of a chemical producer of free radicals at a temperature which is lower than the fusion point of the polyethylene.

---

The present invention relates to a process for grafting onto non-preactivated polyethylene in suspension in a liquid phase, which is preferably aqueous, unsaturated acids or esters which are soluble in the said phase. The acids or esters include, particularly unsaturated mono- or dicarboxylic acids and their esters and more especially acids or esters of the acrylic or methacrylic type.

In numerous fields, the possible uses of polyethylene are limited by reason of its inert character. Consequently a great deal of work has been done with a view to producing, on the hydrocarbon chain of the polyethylene, chemical groups which causes its chemical inertia to be partially reduced and thus allow its possible application to be increased. In particular, the attachment on the hydrocarbon chain of the polyethylene of acids or esters having polar functions allows a certain number of properties to be substantially improved. These includes more especially, its mechanical strength, its suitability for dyeing, its adherence to metals, and its compatibility with other polymers.

To achieve these improvements, the grafting of polymerisable monomers onto the parent polymer is currently used and there are numerous grafting techniques which have been tried.

In the case of grafting by a radical process, various methods have been suggested.

One can, for example, pretreat the polyethylene in a first stage, which is independent of the grafting reaction, with a view to creating, on the hydrocarbon chain, active sites which will serve, in a second stage, to initiate the polymerisation of the monomer (see for example French Pat. No. 1,255,947 and British Pats. Nos. 963,771 and 783,-790).

It is also possible to obtain simultaneous activation and grafting by submitting a solution of the polyethylene and monomer in a suitable solvent to the action of peroxides (U.S. Pat. No. 2,970,129).

These techniques often prove to be difficult to implement and, in addition, the grafted polymers which are obtained are always polluted to a greater or lesser degree, by homopolymers corresponding to the polymerisable monomers which one wishes to graft.

It has also been proposed, in French Pat. No. 1,420,-772, that polymerisable monomers be grafted by a radical process onto certain polyolefines in suspension in a liquid phase, generally aqueous.

This technique of grafting in suspension applies only to the sole monomers insoluble in the said aqueous phase, using initiators also insoluble in the said phase, but soluble in the monomer.

In view of the fact that the monomers are insoluble in the aqueous phase, the homopolymers corresponding to these monomers are themselves insoluble in the said phase. Thus, one would only obtain by this method a polluted grafted polymer, the purification of which would necessitate long and complicated separation extraction techniques.

Any attempt to modify the non-preactivated polyethylene by the technique of grafting in suspension, and by replacing the insoluble monomer by a monomer which is soluble in the liquid phase of the polyethylene dispersion of the polyethylene, which might permit an easier accomplished separation and purification of the grafted polyethylene, makes the grafting of the monomer onto the polyethylene highly improbable.

In fact, the polyethylene possesses only a very low proportion of tertiary carbons capable of furnishing active sites under the influence of free radicals, and, on the other hand, the coefficient of separation of the monomer which is soluble in the liquid phase is distinctly unfavourable to the hydrocarbon phase, especially if the pure monomer swells the polyethylene only very slightly. As a result, in the case of a soluble monomer one could expect a priori an exclusive homopolymerisation of the monomer.

Contrary to all expectations, the present applicants have found that it is possible to graft with excellent yields onto non-preactivated polyethylene dispersed in a liquid phase, which is generally aqueous, unsaturated acids or esters which have a double bond activatable by a radical process and which are entirely soluble in the liquid phase of dispersion of the polyethylene, the homopolymers which acids or esters are of low molecular mass and are soluble or emulsionable in the said liquid phase.

The process of the invention for grafting unsaturated acids or esters onto polyethylene involves subjecting to the action of a chemical producer of free radicals, at a temperature which is lower than the fusion point of the polyethylene, a suspension of this non-preactivated polyethylene in a liquid phase, which is generally aqueous and which contains dissolved in it the polymerisable unsaturated acid or acids or ester or esters that are to be grafted.

In view of the fact that the homopolymers corresponding to the acid or ester are soluble or emulsifiable in the reaction phase, the process of the invention allows pollution of the grafts to be avoided, since these grafts can be substantially obtained, free from any homopolymer derived from the reaction medium, by simple filtering and washing, which eliminates the previous complex purification steps.

The process of the invention is applicable to the treatment of all varieties of polyethylene which have been so far tested. It is possible, for example, to use polyethylene prepared by the high-pressure technique, low-pressure polyethylene prepared by Ziegler catalysis, and others.

The polyethylene can be in any suitable physical form, for example in the form of powder, granules, fibers or films.

The grafting process of the invention can also be applied to polyethylene which has already been partially grafted by this same process.

The polymerisable monomers which can be used in the process of the invention comprise particularly those unsaturated acids or esters which have a double bond capable of being activated by a radical process, which are completely soluble in the liquid phase serving for the dispersion of the polyethylene, and the homopolymers of low molecular weight which are soluble or emulsifiable in the said phase.

Monocarboxylic or polycarboxylic acids or sulphonic acids can be used as unsaturated acids.

Among the monocarboxylic acids, examples are the water-soluble unsaturated acids, such as acrylic acid, methacrylic acid, α-chloroacrylic acid, 1,2-dichloracrylic acid, crotonic acid, which are unsaturated acids soluble in water/alcohol mixtures, such as cinnamic acid and ω-undecylenic acid.

Amongst the unsaturated polycarboxylic acids, examples are the unsaturated dicarboxylic acids which are soluble in water such as maleic acid and its anhydride, itaconic acid, citraconic acid and glutaconic acid.

Among the unsaturated sulphonic acids vinylsulphonic acid can be mentioned.

As unsaturated esters, it is preferred to use the esters derived from the aforesaid acids having an esterifying group which is a saturated aliphatic hydrocarbon residue having up to 18 carbon atoms, which may or may not be substituted by a hydroxyl group or an amino group.

Examples of such monomers are methyl acrylate, ethyl acrylate, butyl acrylate, methyl methacrylate, methyl 2-chloroacrylate, propylene glycol monomethacrylate, dimethylaminoethyl methacrylate, alkyl maleates, such as methyl maleate and ethyl maleate, alkyl itaconates such as methyl itaconate, alkyl citraconates such as methyl citraconate, and alkyl vinylsulphonates such as methyl vinylsulphonate.

The unsaturated acids or esters can be grafted individually or mixed one with another, and even with other monomers, provide however that these latter are entirely soluble in the liquid phase.

As the producers of free radicals, the hydroperoxides, the alkyl, acyl, ketone peroxides, the peracids, the peresters and the azoic compounds can be used whether they are insoluble in, or are partially or wholly soluble in the liquid phase.

The initiators can be used in redox systems or with decomposition accelerators. In the case of initiators which are insoluble in the liquid phase, a very fine dispersion is generally desirable. This dispersion of the insoluble initiator is obtained very easily by the addition, to the liquid phase while it is under agitation, of a solution of the said initiator in a suitable solvent, provided this latter will not disturb the grafting reaction.

Examples of initiators which can be used in the process of the invention are benzoyl peroxide, benzoyl peroxides substituted on the aromatic nucleus, tertiarybutyl perbenzoate, tertiarybutyl peroctoate, dicumyl peroxide and lauroyl peroxide.

The liquid phase used for the dispersion of the polyethylene does not have to dissolve and must not dissolve the said polyethylene, but it does have to be a solvent for the polymerisable monomer which is to be grafted. In addition, the fractions of low molecular mass of the homopolymer corresponding to the monomer that is to be grafted have to be soluble or emulsifiable in the said phase.

When the monomer is water soluble, which is the case with many acids, the liquid phase of the dispersion of the polyethylene is preferably water. When the monomer is not very soluble in water, which is generally the case with esters, the liquid phase is best constituted by a mixture of water and an active polar solvent which is completely miscible to water. By active polar solvent there is meant a solvent which fosters the dissolution of the monomer in the aqueous phase, the bringing into emulsion of any homopolymer formed and, where applicable, the dissolution of the producer of free radicals. It is to be understood that the use of mixed water and active polar solvent phase can be included referring to monomers which are entirely soluble in water.

Although the proportion of active polar solvent in the aqueous phase can vary within large limits, it is preferably kept less than 50% by volume, since for higher values the grafting rate decreases substantially.

As examples of active polar solvents which can be added to the water, there are the aliphatic alcohols, such as butanol and ethanol and amides such as dimethylformamide.

It is also possible to accelerate the polymerisation of certain unsaturated monomers, such as acrylic acid or methacrylic acid, by dissolving mineral salts, such as sodium chloride or potassium chloride, in the liquid phase, or by decreasing the pH of the said phase by adding mineral or organic acids.

The wetting ability of the polyethylene in the liquid phase can be increased by using surface-active agents which may be cationic, anionic or non-ionic. The choice of this agent depends on its effectiveness and by the fact that it should introduce only a minimum of side reactions.

By way of example, the alcoylsulphates of alkali metals, such as sodium laurylsulphate, the alcoylphenoxy-polyoxyethylene ethanols, and sodium laurylsarcosinate such as one which is sold under the name (Sarkosyl NL97), may be mentioned. If the surface-active agent is not sufficient to obtain a good dispersion of the polyethylene, recourse may have to be made to suspension agents, while in the case of the grafting of certain unsaturated acids such as acrylic acid or methacrylic acid, it is preferable to choose compounds which will not raise the pH of the medium unduly for example cellulose compounds, such as hydroxypropyl methyl cellulose known as (Methocel HG 90), and polyvinyl alcohols may be used.

In certain cases the grafting reaction can be effected in the absence of a surface active agent, if the fixing of the first lyophil grafts fosters from the start of the reaction, the wetting of the polyethylene.

To permit regularity in the length of the grafts and to assist in the control of the kinetics of the grafting reaction, transfer agents can be added to the reaction medium, these include, more especially aliphatic hydrocarbons, and mercaptans such as tertiarydodecyl mercaptan.

To increase to a maximum the homogeneity of the final graft and to reduce appreciably the proportion of polymer which is not grafted, the agitation of the reactional medium should be the most effective one possible.

The quantity of the liquid medium which is used to implement the grafting reaction depends on the one hand, on the bringing into suspension of the polyethylene, which depends generally on the physical form in which this latter is used, and, on the other hand, by the quantity of monomer which is to be grafted. It can vary from 1 to 100 parts per part of polyethylene, but it is preferably between 2 and 30 parts.

The quantity of monomer which comes into the reaction is a function of numerous factors, notably the physical form of the polyethylene that is to be treated and the quantity of monomer that is introduced. This quantity can vary from 0.5 to 100% by weight of the polyethylene, usually it is between 0.5 and 40%.

The quantity of catalyst can vary from 0.5 to 5 percent by weight of the monomer.

The proportion of surface-active agent is not critical but it should be fairly close to the minimum quality which is needed to obtain an effective dispersion of the polyethylene to be treated.

To carry out the process of the invention, the non-preactivated polyethylene is brought into suspension, if necessary with the aid of a surface-active agent, in the agitated homogeneous liquid phase. The monomer, which is entirely soluble in this phase at the reaction temperature, is introduced, to either before or after the dispersion of the polyethylene in this phase, and, according to whether its thermal homopolymerisation is low or high, its addition is effected at a temperature close to ambient or only at the reaction temperature. The initiator is then added at a temperature which can be different from that at which the monomer was introduced and the whole then kept at the reaction temperature for a sufficient time to obtain the desired degree of grafting.

In a preferred method of carrying out the invention the initiator is introduced into the reaction medium in the form of a solution or dispersion in the polar solvent which is used in the preparation of the mixed aqueous phase.

Since the presence of oxygen is general prejudicial, the reaction is preferably effected in an inert atmosphere.

The temperature and the duration of the reaction depend in particular on the catalyst used.

The temperature will in all cases be lower than the fusion temperature of the polyethylene, and is preferably higher than 60° C.

The duration of the reaction can vary from 10 minutes to six hours, but it is preferably comprised between 15 minutes and 4 hours.

The fixing on the saturated hydrocarbon chain of the polyethylene of polar functions acids or esters, even for a very low rate of grafting, gives the material a remarkable adhesion on various substrata, which permits the grafts of the invention to be used for metal facings or bondings and for textile coatings. Polyethylene which has been grafted in accordance with the invention has, in addition, an improved transparency.

The grafted product of the invention can, in addition, be mixed with the initial, ungrafted polyether in various proportions, in order to obtain a product which has certain of its properties improved with respect to the initial polyethylene.

The following examples illustrate the invention.

EXAMPLE 1

Into a reactor made of stainless steel of one liter capacity there are:

| | Parts by wt. |
|---|---|
| High-pressure polyethylene (in the form of a powder having a density of 0.92 g./cm.$^3$ and a melt index of 17.5) | 100 |
| Water | 1000 |
| Acrylic acid | 25 |
| Surface-active agent (sodium laurylsulphate) | 0.1 |

The acrylic acid is entirely soluble in the aqueous phase.

The polyethylene is brought into suspension in the acrylic solution by mere agitation and the whole is brought, under an inert atmosphere, to the reaction temperature of 93° C. (the thermal homopolymerisation of acrylic acid is negligible at the concentration used).

This temperature having been reached, benzoyl peroxide (0.484 part), dissolved in the minimum of acetone is added. The solvent is separated out at the instant of addition and the benzoyl peroxide which is almost insoluble in the reaction phase, is dispersed finely in it.

The production of grafted acrylic acid $\tau$, expressed in percentage by weight of the grafted polymer, and the graft yield R, expressed as a percentage by weight with respect to the monomer used, both expressed as a function for the 15 min., 30 min. and 1.15 hour grafts.

| | Time | | | | | | | | | |
|---|---|---|---|---|---|---|---|---|---|---|
| | Minutes | | Hours | | | | | | | |
| | 15 | 30 | 1 | 1.15 | 2 | 2.30 | 3 | 4 | 5 | 6 |
| $\tau$ | 4.30 | 8.05 | 12.80 | 14.00 | 15.90 | 16.55 | 16.80 | 16.45 | 16.95 | 16.95 |
| R | 67.00 | 74.4 | 82.2 | 83.5 | 85.3 | 85.9 | 86.1 | 86.2 | 86.2 | 86.2 |

The grafting is preferably effected until the homopolymerisation yield R is greater than 50% and until the proportion of monomer grafted to the total monomer converted ceases increasing during the course of reaction. At the end of reaction, the conversion reaches almost the same value (94.6%) as in the case of the homopolymerisation of acrylic acid in the absence of polyethylene, but 81.6% of the starting acid has been converted into graft, while only 13.0% has been converted into homopolymer.

The grafted polyethylenes are recovered by filtering and are washed with water.

By dissolving the raw grafts thus obtained in xylene and by reprecipitating them with methanol, no acidity is extracted, even when the operation is repeated three times or if the solvent/precipitant is changed (the polyacrylic acid having to be soluble in this latter).

The degree of grafting as checked by elemental analysis, is not reduced. The homopolymer formed during the reaction, therefore, remains entirely soluble in the aqueous phase and is not retained by the graft.

While the initial polyethylene if it is pressed hot onto an aluminium plate, easily comes unstuck from the cold substrate, the graft obtained after 15 minutes, which include 4.3% of polyacrylic acid, adheres strongly to such a substrate and can only be pulled off it with difficulty.

The index of fluidity, which was 17.5 for the initial polyethylene, changes respectively to 3.40, 0.50 and 0.10 for the 15 min., 30 min. and 1.15 hour grafts.

If a parallel traction force is applied to the coating material, the force point is increased at the flow threshold from 120 kg./cm.$^2$ for the initial polyethylene, to 144, 149 and 155 kg./cm.$^2$ respectively for the aforesaid grafts, which represent improvement of 20% to 30% with respect to the initial product.

If the grafted products are treated by normal ethanolic or methanolic soda at 60° C. for 2 hours, the degrees of salification under these conditions come close to or reach 100%.

The index of fluidity of the "salified" grafts thus obtained is substantially less than that of the original grafts. The introduction of the ionic bonds also results in an increase in the load at the flow threshold of for example, 144 to 160 kg./cm.$^2$ or of from 155 to 180 kg./cm.$^2$, or an overall improvement of 50% with regard to the initial product.

EXAMPLE 2

The reaction of Example 1 is repeated but by using 29.8 parts of methacrylic acid and reducing the temperature to 80° C., the value $\tau$ and the graft yield R, as a function of time are as follows:

| | Time | | | | | | | | | |
|---|---|---|---|---|---|---|---|---|---|---|
| | Minutes | | | Hours | | | | | | |
| | 15 | 30 | 45 | 1 | 1.15 | 1.30 | 2 | 2.30 | 3 | 4 |
| $\tau$ | 3.40 | 6.05 | 8.85 | 11.15 | 13.25 | 14.95 | 16.20 | 17.55 | 18.25 | 18.35 |
| R | 59.5 | 61.8 | 65.3 | 66.4 | 69.1 | 71.9 | 75.4 | 76.3 | 78.0 | 78.0 |

The grafting of the methacrylic acids is also effected in preference to homopolymerisation.

The grafts recovered by filtering and washing are free from polymethacrylic acid homopolymer.

The properties and improvements, which have been mentioned for the grafts with acrylic acid in Example 1, are also observed for the grafts with methacrylic acid.

The "methacrylic acid" grafts have for a same degree of graft and for identical reaction parameters, indices of fluidity which are generally higher than those of the grafts with acrylic acid.

The "methacrylic acid" grafts, in addition to the increase in the load at the flow threshold point under tension, are characterised by a modulus of elasticity which is higher by at least 50% than that of the initial polyethylene.

EXAMPLE 3

The reaction of Example 1 is repeated, but with the high-pressure polyethylene replaced by low-pressure polyethylene (Ziegler type) of the same granulometry.

With "Hostalen GF 5.250" powder, which has a density of 0.95 g./cm.$^3$ and a melt index 0.25, the value $\tau$ and the graft yield R are as follows:

|   | Time (hours) | | | |
|---|---|---|---|---|
|   | 1 | 2 | 3 | 4 |
| $\tau$ | 3.47 | 5.29 | 6.33 | 6.72 |
| R | 28.1 | 36.1 | 39.2 | 40.6 |

The grafting of acrylic acid is here less than the homopolymerisation (R<50%). However, the grafting can be increased above the homopolymerisation by modifying the reaction parameters.

EXAMPLE 4

The reaction of Example 1 is repeated, but with the polyethylene powder replaced by spherical granules of the same product, 3 to 5 mm. in size.

After one hour of reaction, the degree of grafting of the granules reaches 1.50% (the graft yield being 15%).

EXAMPLE 5

The reaction of Example 1 is repeated, but with the polyethylene powder replaced by a film of the same product 0.1 mm. thick. After one hour of reaction, the graft yield reaches 3.5%.

The film thus grafted, when pressed hot onto an aluminium plate, adheres strongly to the latter.

EXAMPLE 6

The reaction of Example 1 is repeated, but with the benzoyl peroxide replaced by lauroyl peroxide, the temperature being lowered to 80° C.

With 0.796 part of lauroyl peroxide (same molar concentration as for the benzoyl peroxide), the degree of evolution and the graft yield, as a function of time, are as follows:

|   | Time | | | | | | | | |
|---|---|---|---|---|---|---|---|---|---|
|   | Minutes | | Hours | | | | | | |
|   | 15 | 30 | 1 | 1.30 | 2 | 2.30 | 3 | 4 | 5 | 6 |
| $\tau$ | 2.60 | 4.90 | 8.55 | 11.05 | 12.70 | 13.20 | 13.90 | 14.50 | 14.80 |   |
| R | 53.0 | 75.4 | 78.7 | 79.9 | 80.3 | 80.6 | 80.9 | 81.5 | 82.0 |   |

The grafts obtained with lauroyl peroxide have an index of fluidity higher than that obtained with benzoyl peroxide (e.g.: $\tau$=11.5%, and index of fluidity: 4.8). The improvement in the mechanical characteristics is nevertheless of the same order of magnitude as in the case when benzoyl peroxide is used.

EXAMPLE 7

The reaction of Example 1 is repeated, but using 10 parts of polyethylene instead of 100.

High degrees of grafting are reached very rapidly but at the expense of a lower selectivity.

|   | | Hours | | | |
|---|---|---|---|---|---|
| Time | 30 min. | 1 | 1.30 | 2 | 2.30 |
| $\tau$ | 9.3 | 16.0 | 20.4 | 22.2 | 23.1 |
| R | 15.8 | 21.7 | 25.2 | 26.2 | 26.4 |

EXAMPLE 8

The reaction of Example 1 is repeated, but using 200 parts of polyethylene and 10.5 parts of acrylic acid.

The degree of grafting is very high and approaches 100 percent.

|   | Time | | | | | | | | |
|---|---|---|---|---|---|---|---|---|---|
|   | Minutes | | Hours | | | | | | |
|   | 15 | 30 | 45 | 1 | 1.15 | 1.30 | 2 | 2.30 | 3 |
| $\tau$ | 0.7 | 1.6 | 2.3 | 2.8 | 3.2 | 3.5 | 3.8 | 4.2 | 4.3 |
| R | 79.5 | 89.8 | 91.0 | 93.0 | 93.7 | 94.1 | 94.6 | 94.9 | 95.0 |

EXAMPLE 9

The reaction of Example 6 is repeated but with the 1000 parts of water replaced by 1000 parts of a normal solution of sodium chloride.

The grafting is accelerated and its degree nears 100%.

|   | Time | | | | | | | |
|---|---|---|---|---|---|---|---|---|
|   | Minutes | | Hours | | | | | |
|   | 15 | 30 | 45 | 1 | 1.30 | 2 | 2.30 | 3 | 4 |
| $\tau$ | 11.1 | 14.1 | 15.2 | 16.4 | 17.0 | 17.6 | 18.2 | 18.7 | 19.2 |

EXAMPLE 10

The reaction of Example 1 is repeated, but with the 100 parts of polyethylene replaced by 100 parts of the graft obtained from the reaction 1. By renewing the grafting reaction on this product which had been grafted to 16.95 percent, a graft with a value of 27.6 percent is obtained at the end of 5 hours of reaction.

By repeating the reaction a third time, a graft having a grafted value of 32.7 percent is obtained at the end of 5 hours of reaction.

Upon the regrafting on the pregrafts, the grafting yield reaches almost 100 percent.

EXAMPLE 11

The reaction of Example 6 is repeated, but with the 1000 parts of water replaced by a mixture of 950 parts of water and 50 parts of n-butanol.

After 30 minutes of reaction, a graft at 6.30 percent is obtained. The index of fluidity is 11.3, and is therefore much higher than when pure water is used as the dispersion phase.

EXAMPLE 12

The reaction of Example 1 is resumed but with the addition in, increasing quantities, of tertiary-dodecylmercaptan (tDM).

For neighbouring degrees of grafting, the adding of this transfer agent greatly modifies the fluidity of the grafts. This modification is all the stronger as the proportion of the t-dodecylmercaptan with respect to the initiator, is increased, without changing substantially the other parameters of the reaction, as the following table shows:

| Parts of tDM | Parts tDM/ parts BZ$_2$O$_2$ | Time | $\tau$ | Index of fluidity |
|---|---|---|---|---|
| 0 | 0 | 30 minutes | 8.05 | 0.74 |
| 0.100 | 0.25 | do | 7.90 | 1.34 |
| 0.200 | 0.50 | 25 minutes | 7.20 | 7.03 |
| 0.400 | 1.00 | 2.50 hours | 5.0 | 10.65 |

EXAMPLE 13

Into a reactor of 1 litre, there are introduced:

| | Parts by wt. |
|---|---|
| Water | 300 |
| 95% ethanol | 80 |
| High-pressure polyethylene powder having a density of 0.918, an index of fluidity of 2 and an average molecular weight of 21,000 | 20 |
| Sodium lauryl sulphate | 0.1 |

The medium is taken to 85° C. When this temperature has been reached:

5.4 parts of ethyl acrylate, are added. After this has dissolved 0.6 part of benzoyl peroxide dissolved in 5 cm.³ of acetone are added.

The acrylate is entirely soluble. The peroxide is very finely dispersed in the medium. The reaction is carried out in an inert atmosphere. After return to ambient temperature, the solid phase is separated by filtration.

The solid product is washed with water and with acetone under reflux.

Evidence of the graft is shown in the following manner. Two fractions of the product are dissolved hot in xylene (no trace of insoluble product is found) and precipitated at boiling point, one by methyl ethyl ketone and the other by methanol. The solution/precipitation operations are repeated three times. An elementary analysis, checked by an infrared test gives a graft of 5.4 percent.

To verify the effectiveness of the method of purification of the products (elimination of the homopolymer), the preceding reaction is repeated in the absence of polyethylene. During the course of this homopolymerisation reaction of the ethyl acrylate, the aqueous phase becomes milky, and the presence of dispersed waxes is noted. Using a decantation ampule the alcohol/water is washed with ether: two washes clarify the aqueous phase. The ethers contain peroxide residues, the homopolymers of very low molecular weight and the monomer which has not reacted. The waxes which are non-soluble in the ether are separated by decantation. They are completely soluble either in xylene or in methanol or methyl ethyl ketone.

An alcoholic solution of these waxes is used to precipitate the polyethylene used in the reaction, in solution in xylene: no amount of homopolymer is found in the polyethylene precipitated.

In a like manner, a mixture of polyethylene and of ethyl polyacrylate is separated into its components by the solvent/non-solvent pairs used.

The products of the grafting reaction both before purification and after purification, have the same composition, and no homopolymer is found formed in the polyethylene matrix.

If the homopolymerisation reaction is effected as previously, but with the alcohol content absent from the medium which is (400 parts of water), the state of dispersion of the peroxide is very inferior. Sticky particles appear rapidly in the liquid phase; these are the peroxides. They are insoluble in hot xylene or methanol, they are strongly reticulated, and it becomes very difficult, if not even impossible to eliminate them during the course of a grafting operation.

EXAMPLE 14

Into a reactor of 1 litre, there are introduced:

| | Parts by wt. |
|---|---|
| Water | 320 |
| 95% ethanol | 80 |
| High-pressure polyethylene powder (the density of the polyethylene being 0.924, and its index of fluidity being 3.4) | 20 |
| Sodium lauryl sulphate | 0.1 |

The medium is brought to 80°. When this temperature is reached, then they were added.

5.4 parts of ethyl acrylate, followed, after it has dissolved, by 0.59 parts of lauroyl peroxide.

The temperature is kept for 1 hour at 80° C. The product is treated as in Example 1. The grafting rate is 4%.

The homopolymerisation of the ethyl acrylate in the presence of lauroyl peroxide and in the absence of polyethylene, carried out in the same manner as in Example 1, produces similar results.

The graft product does not contain any homopolymer.

A simple filtration, followed by a washing with boiling acetone allows the graft product to be isolated.

EXAMPLE 15

The reaction is carried out as in Example 13 but with the ethyl acrylate replaced by 5.4 parts of methyl methacrylate.

The results formed on the homopolymerisation of the methyl methacrylate, in the absence of polyethylene and with or without alcohol, are similar to those described in Example 1.

The degree of graft obtained is 6% by weight.

EXAMPLE 16

This is carried out as in Example 13, but with the 95% ethanol replaced by 80 parts of dimethyl formamide. A graft value of 6% by weight is obtained. The dimethylformamide solvent of the ester is very well suited to form the mixed aqueous phase. In fact, the benzoyl peroxide dissolved in the minimum quantity of this solvent is dispersed in the water/dimethylformamide phase to give an emulsion. On the other hand, the said solvent is also an inflator of the polyethylene, and its high boiling point allows the grafting temperature to be raised to the vicinity of 100° C. in open reactor.

The homopolymers formed corresponding to the ethyl acrylate or to the methyl acrylate are in the form of an emulsion in the water/dimethylformamide mixture, also in the grafting reaction these homopolymers can be separated by simple filtration and by hot washing with acetone or methyl ethylketone.

We claim:

1. A process for grafting onto non-preactivated polyethylene at least one monomer selected from the group formed by ethylenically unsaturated acids and esters, under the action of a chemical producer of free radicals, which process consists essentially of first forming an aqueous suspension of said non-preactivated polyethylene containing completely dissolved in the aqueous phase thereof each monomer to be grafted wherein the aqueous phase is water or a mixture of water and a polar solvent and thereafter subjecting the resulting suspension to the action of said producer of free radicals at a temperature which is lower than the fusion point of said polyethylene.

2. A process as claimed in claim 1, wherein the aqueous phase is water.

3. A process as claimed in claim 2, wherein each monomer is selected from the group formed of acrylic, methacrylic, alpha-chloracrylic and maleic acids.

4. A process as claimed in claim 1, wherein the aqueous phase is a mixture of water and a polar solvent which is entirely miscible with the water, the proportion by volume of the solvent in the mixture being in the range from 0.1% to 50%, inclusive.

5. A process as claimed in claim 4, wherein the proportion is in the range from 5% to 30% inclusive.

6. A process as claimed in claim 4, wherein the polar solvent is selected from the group formed of aliphatic alcohols and aliphatic amides of low molecular weight.

7. A process as claimed in claim 4, wherein said polar solvent is selected from the group formed by ethanol, n-butanol and dimethyl formamide.

8. A process as claimed in claim 4, wherein each monomer to be grafted has a formula:

in which R is selected from the group formed of hydrogen, halogens and methyl radicals, and R' is selected from the group formed of hydrogen and alkyl aminoalkyl and hydroxyalkyl radicals having from 1 to 18 carbon atoms.

9. A process as claimed in claim 1, wherein the proportion of monomer in the reaction mixture is in the range from 0.5% to 40% by weight of the polyethylene.

10. A process as claimed in claim 1, wherein the chemical producer of free radicals is a peroxide.

11. A process as claimed in claim 1, wherein the chemical producer of free radicals is selected from benzoyl peroxide and lauroyl peroxide.

12. A process as claimed in claim 1, wherein the temperature of the grafting reaction is in the range from 60° and 100° C.

13. A process as claimed in claim 1, wherein the reaction medium includes a chain transfer agent.

14. A process as claimed in claim 1, wherein the reaction medium includes a mercaptan.

15. A process as claimed in claim 1, wherein the reaction medium includes tertiarydodecyl mercaptan.

16. A process as claimed in claim 1, wherein the grafting reaction is carried out under an inert atmosphere.

References Cited

UNITED STATES PATENTS

| 3,162,696 | 12/1964 | Zimmerman et al. | 260—878 |
| 3,222,423 | 12/1965 | Roebuck | 260—877 |
| 3,347,956 | 10/1967 | Rademacher | 260—878 |

FOREIGN PATENTS

| 1,420,772 | 12/1964 | France | 260—878 |

JOSEPH L. SCHOFER, Primary Examiner

S. M. LEVIN, Assistant Examiner

U.S. Cl. X.R.

117—132 R, 161 UZ, 161 UT